United States Patent [19]
Voigt et al.

[11] 3,973,985
[45] Aug. 10, 1976

[54] STARCH PRODUCT BY FURTHER OXIDIZING OXIDIZED STARCH WITH AMMONIUM PERSULFATE

[75] Inventors: John E. Voigt; Edward M. Bovier, both of St. Louis County, Mo.

[73] Assignee: Anheuser-Busch, Incorporated, St. Louis, Mo.

[22] Filed: June 3, 1974

[21] Appl. No.: 475,619

[52] U.S. Cl. ............................ 127/33; 106/213; 106/214; 127/32; 127/70; 536/102
[51] Int. Cl.² ........................................ C13L 1/08
[58] Field of Search .................. 127/32, 33, 70; 260/233.3 R; 106/213, 214

[56] References Cited
UNITED STATES PATENTS

| | | | |
|---|---|---|---|
| 2,173,041 | 9/1939 | Muller | 260/233.3 |
| 2,894,945 | 7/1959 | Hofreiter et al. | 260/233.3 |
| 3,255,040 | 6/1966 | Huber et al. | 127/32 |

OTHER PUBLICATIONS
Kenneth A. Craig et al., Tappi, 51(11), 82A–88A, Nov. 1968.

*Primary Examiner*—Morris O. Wolk
*Assistant Examiner*—Sidney Marantz
*Attorney, Agent, or Firm*—Gravely, Lieder & Woodruff

[57] ABSTRACT

Starch is prepared for use in the manufacture of paper products by reacting an alkaline hypochlorite oxidized starch with ammonium persulfate. The treatment provides a starch product which when pasted at high temperatures will degrade to give a low viscosity material. The process includes the steps of slurrying lightly oxidized starch in water and further oxidizing the starch with ammonium persulfate. When this starch is suspended in water and heated to pasting, it shows lower viscosities than other starches of comparable starting viscosities.

12 Claims, No Drawings

STARCH PRODUCT BY FURTHER OXIDIZING OXIDIZED STARCH WITH AMMONIUM PERSULFATE

BACKGROUND OF THE INVENTION

In the paper industry, starch is used as an adhesive in coating compositions. The starch binds the pigment to the paper web and also bonds pigment particles together. Starches which are employed as adhesives in coating compositions are usually modified by one of several methods, such as enzymatic degradation, acid hydrolysis, oxidation, or dextrinization. Each process has its own merits and deficiencies, but each is successful to some degree in producing a starch of a desired reduced viscosity for use in coatings. But attendant with the use of some of the modification processes are many problems of discoloration, retrogradation of the converted material, high viscosity if the product is cooled too quickly or stored too long before use, and loss of adhesive strength.

SUMMARY OF THE INVENTION

The present invention comprises an alkaline hypochlorite oxidized starch which is reacted with ammonium persulfate. The starch product when pasted at high temperatures will degrade to give a lower viscosity material than other starches of comparable starting viscosities. The present invention further comprises a process of making said starch product by treating lightly oxidized starch with ammonium persulfate.

DETAILED DESCRIPTION

Coating formulations for webs, such as paper, commonly comprise a pigment and an adhesive; the adhesive serves the purpose of binding pigment to the web and of bonding pigment particles together. The starch employed as such adhesive is usually modified by any one of several processes. The purpose of such modification is to permit the provision of a paste of regulated viscosity for the coating formulation when the starch is cooked.

Native starches exhibit, when cooked, a thickness or viscosity which is generally too great for mineral coating compositions which are employed in the treatment of paper. Reduction of viscosity of unmodified or native starches by the addition of water reduces the starch concentration to such an extent that the adhesive effect of the starch is too low; further, water dispersions of native cooked starch are sensitive to changes in hydration, occasioning considerable viscosity change and, accordingly, such starches are difficult to control in coating compositions.

The effect of starch modification is to alter to some extent the molecular nature of the starch and to permit the control and reduction of starch viscosity. However, reduction of viscosity is accompanied by a decrease in adhesive strength. Therefore, control of such modification must be carefully exercised in coating composition formulations.

Viscosities of coating compositions usually vary with the nature of the coating device and, for specific purposes, may be varied over a wide range. The practice of this invention facilitates accurate viscosity control in coating formulations.

The use of ammonium persulfate with an oxidized starch in the process of this invention is essential in preparing a thermal converting starch. When the starch product of this invention is pasted at high temperatures is will degrade to give a low viscosity material.

The practice of a preferred embodiment of the present invention involving the preparation of starch for use in paper coating compositions is shown hereinafter.

An aqueous slurry of an oxidized starch is formed with about 30.0 to about 43.0% by weight, starch solids content. The fluidity of the oxidized starch is about 10 to about 60. The starch has a carboxyl number of about 0.05 to about 0.20%, as measured by Procedure C-22 of the Standard Analytical Methods of the Corn Refiners Association. The oxidation of the starch can be performed by an alkaline hypochlorite oxidizing agent such as sodium or calcium hypochlorite. In this case, the starch is oxidized with about 1.0 to about 2.0% available chlorine. Any other suitable method known in the art can also be used for this oxidation.

The slurry is heated from about 100°F. to about 130°F. and about 0.1 to about 1.0%, preferably 0.5%, by weight ammonium persulfate is added to the slurry. This further oxidizes the starch which is allowed to react in the slurry for about 2 hours with agitation. The pH is adjusted to about 5.5 to about 6.5 with dilute NaOH. If desired, about 0.1 to about 1.0% by weight, preferably about 0.3% of a reducing agent then can be added to the slurry to reduce any excess oxidizing agent. The preferred reducing agent is sodium bisulfite.

The slurry is then filtered and the starch is dried.

The final product has a carboxyl number of about 0.05 to about 0.20. The fluidity is about 10 to about 60. The starch has a Dudley viscosity of about 38 to about 60 when pasted in water at a 13% solids (dsb) concentration at 160°F.

In use, the starch is mixed with water to form a suspension containing about 15 to about 25% by weight starch solids on a dry solids basis. The starch suspension is heated well above the gelatinization range of the starch and under a pressure of about 15 to about 140 psi for about 2 to 30 minutes. A pressure vessel is suitable for this. The pasted starch is passed into a receiving zone where it is cooled. It is then ready to be used in paper coating formulations.

The raw starch itself may be derived from corn, waxy maize, sorghum, potatoes, wheat, rice, tapioca and the like, although pearl corn starch is preferably employed.

The following specific examples illustrate the novel process of this invention in greater detail. SPECIFIC EXAMPLES

EXAMPLE 1

Five hundred grams of a starch which is oxidized with 1% of available chlorine is slurried in 600 ml. of water at 120°F. Ammonium persulfate, 0.3% by weight of starch, is added to the slurry. These materials are allowed to react for 2 hours with agitation. After the 2 hours, 0.3% by weight sodium bisulfite is added. The slurry is allowed to mix for a few minutes after the bisulfite addition to allow for the reduction of excess oxidizing agent. The pH is adjusted to about 5.5 to about 6.5.

The slurry is filtered and the starch is dried in a forced air oven.

The starch is made into a 20% by weight (dsb) suspension with water and heated under pressure to 165° C. The starch is pasted and maintained at 165°C. for about 20 minutes in a 2 liter autoclave with agitation.

A sample is taken and diluted with water to 13% solids. This sample has a Dudley viscosity reading of 46 seconds at 71.1°C. (160°F.).

The reduced viscosity of the starches of the invention is a desired improvement in thermal converting starches and provides an opportunity for increased productivity in the application of coating compositions.

EXAMPLE 2

The following examples show that even with extended holding times after the ammonium persulfate addition to the alkaline hypochlorite oxidized starch before drying, the product is still acceptable for use in paper coating compositions. The ammonium persulfate can be added to the slurry in the feeder tank prior to filtration. This practice can create an extended holding time before drying. The fact that extended holding times do not affect the product allows for delays in the plant without creating serious problems.

Reslurried starch is used for preparing the samples and slight differences may be encountered with raw starch slurry is used.

Two pounds of pearl corn starch are oxidized with 1.6% available chlorine. After oxidation, the starch is filtered, reslurried, and is treated with 0.5% ammonium persulfate. Samples are taken one-half hour and 20 hours after addition of the ammonium persulfate to determine the effect of extended holding times. The evaluation procedure of the samples in the 2 liter mechanically agitated autoclave is followed as in Example 1. The results are listed in Table I.

TABLE I

| Sample | %(NH$_4$)$_2$S$_2$O$_8$ | Time After (NH$_4$)$_2$S$_2$O$_8$ Addition, hrs. | Dudley 160°F. | Viscosity 130°F. |
|---|---|---|---|---|
| 1 | 0.5 | ½ | 37 | 39 |
| 2 | 0.5 | 20 | 39 | 41 |

EXAMPLE 3

The following examples show the effect of various levels of ammonium persulfate on an oxidized starch.

Five pounds of pearl corn starch are oxidized with 1.6% available chlorine. After oxidation, three 1 pound portions are filtered, reslurried and treated with 0.1, 0.25, and 0.5% ammonium persulfate for 2 hours, and are then filtered and dried. The remaining two pounds are filtered and dried and used for a control (0% ammonium persulfate). The evaluation procedure of the samples in the 2 liter mechanically agitated autoclave is followed as in Example 1. The results are listed in Table II.

TABLE II

| Sample | %(NH$_4$)$_2$S$_2$O$_8$ | Dudley Viscosity 160°F. | Dudley Viscosity 130°F. | Brookfield Viscosity 100°F. | Brookfield Viscosity Overnight | Fluidity |
|---|---|---|---|---|---|---|
| Control | 0 | 53 | 62 | 3760 cps. | 38,500 cps. | 49 |
| 1 | 0.1 | 50 | 57 | 3200 | 30,400 | 55 |
| 2 | 0.25 | 46 | 51 | 3000 | 25,700 | 55 |
| 3 | 0.5 | 43 | 46 | 500 | 12,600 | 56 | fluidity of about 10 to about 60 and a carboxyl number of 0.05 to about 0.2%, and B. adding from about 0.1 to about 1% by weight based on the starch solids of ammonium persulfate as a secondary oxidizing agent to further modify the starch.

2. The process of claim 1 including the step of pasting the said further modified starch.

3. The process of claim 1 including the steps of drying the further modified starch and thereafter reslurrying the starch prior to pasting.

4. The process of claim 1 including the step of adding a reducing agent after the secondary oxidation is completed.

5. The process of claim 1 wherein the starch is initially oxidized by an alkaline hypochlorite oxidizing agent.

6. The process of claim 5 wherein the alkaline hypochlorite oxidizing agent is selected from the group consisting of calcium hypochlorite and sodium hypochlorite.

7. In the process of preparing a thermal converting starch for use in paper coating compositions, the steps of:

A. forming an aqueous slurry of about 30 to 43.0% by weight of a starch which has been oxidized by alkaline hypochlorite having about 1.0 to about 2.0% available chlorine by weight of the starch, the fluidity of the starch being about 10 to about 60, and B. adding to the slurry about 0.1 to about 1.0% ammonium persulfate by weight based on the weight of dry starch solids to further modify the starch.

8. The process of claim 7 including the step of heating a slurry of said further modified starch above the gelatinization temperature of the starch and in the range of between about 85° and about 178°C. under pressure of about 15 lbs./sq. inch to about 140 lbs./sq. inch with agitation thereby pasting said starch.

9. The process of claim 7 wherein the oxidizing agent is selected from a group consisting of sodium hypochlorite and calcium hypochlorite.

10. The process of claim 7 including the step of adding a reducing agent, sodium bisulfite, to the ammonium persulfate containing starch composition after the ammonium persulfate oxidation has proceeded to the desired point to terminate the effects of the second oxidizing agent.

11. The process of claim 7 wherein the starch is dewatered after said further modification and is reslurried in water prior to pasting.

12. A thermal converting starch that has a paste viscosity of about 38 to about 60 Dudley at a solids contents of 13% and a temperature of 160°F.; said starch having been initially oxidized to a carboxyl number of about 0.05 to about 0.20% and a fluidity of about 10 to about 60 and having been further oxidized with about 0.1 to about 1% by weight ammonium persulfate based on the starch solids.

What is claimed is:

1. A process for preparing starch for use in paper coating compositions, comprising the steps of:

A. forming an aqueous slurry containing about 30 to about 43% by weight of an oxidized starch having a

* * * * *